(12) United States Patent
Wei

(10) Patent No.: US 11,372,502 B2
(45) Date of Patent: Jun. 28, 2022

(54) CAPACITIVE TOUCH DEVICE AND GESTURE RECOGNITION METHOD THEREOF, CHIP AND STORAGE MEDIUM

(71) Applicant: Shenzhen Goodix Technology Co., Ltd., Guangdong (CN)

(72) Inventor: Haijun Wei, Guangdong (CN)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 0 days.

(21) Appl. No.: 17/492,605

(22) Filed: Oct. 2, 2021

(65) Prior Publication Data
US 2022/0027036 A1 Jan. 27, 2022

Related U.S. Application Data

(63) Continuation of application No. PCT/CN2020/089433, filed on May 9, 2020.

(30) Foreign Application Priority Data

Mar. 31, 2020 (CN) .......................... 202010247812.1

(51) Int. Cl.
G06F 3/041 (2006.01)
G06F 3/044 (2006.01)

(52) U.S. Cl.
CPC .......... *G06F 3/04182* (2019.05); *G06F 3/044* (2013.01); *G06F 3/04166* (2019.05)

(58) Field of Classification Search
CPC ... G06F 3/04182; G06F 3/04166; G06F 3/044
See application file for complete search history.

(56) References Cited

U.S. PATENT DOCUMENTS

| 8,040,142 B1 * | 10/2011 | Bokma | H03K 17/955 324/658 |
| 8,823,678 B2 * | 9/2014 | Li | G06F 3/04166 345/174 |

(Continued)

FOREIGN PATENT DOCUMENTS

| CN | 102750060 A | 10/2012 |
| CN | 102799325 A | 11/2012 |

(Continued)

OTHER PUBLICATIONS

Shenzhen Goodix Technology Co.,Ltd., International Search Report, PCT/CN2020/089433, dated Jan. 4, 2021, 4 pgs.

(Continued)

*Primary Examiner* — Michael Pervan
(74) *Attorney, Agent, or Firm* — USCH Law, PC

(57) ABSTRACT

A capacitive touch device and a gesture recognition method thereof, a chip and a storage medium are provided. In some embodiments, the gesture recognition method includes: sampling a capacitance of a capacitive sensor in the capacitive touch device to acquire a capacitance sampling value corresponding to a current sampling frame; determining a first capacitance value of an interference capacitance caused by a liquid on the capacitive sensor according to the capacitance sampling value and reference information corresponding to the current sampling frame; determining a touch state of the capacitive sensor represented by the current sampling frame according to the capacitance sampling value and the first capacitance value of the interference capacitance corresponding to the current sampling frame; and recognizing a gesture of a user on the capacitive touch device according to timing information of the touch state represented by the current sampling frame and a historical touch state of the capacitive sensor.

20 Claims, 7 Drawing Sheets

(56) References Cited

U.S. PATENT DOCUMENTS

| | | | |
|---|---|---|---|
| 8,970,544 B1 | 3/2015 | Mohindra | |
| 9,494,627 B1* | 11/2016 | Bokma | G06F 3/04182 |
| 2011/0216033 A1* | 9/2011 | Mamba | G06F 3/047 |
| | | | 345/174 |
| 2012/0043976 A1* | 2/2012 | Bokma | H03K 17/955 |
| | | | 324/679 |
| 2012/0293447 A1* | 11/2012 | Heng | G06F 3/044 |
| | | | 345/174 |
| 2013/0257767 A1* | 10/2013 | Wu | G09G 5/18 |
| | | | 345/173 |
| 2013/0257785 A1* | 10/2013 | Brown | G06F 3/04182 |
| | | | 345/174 |
| 2013/0257786 A1* | 10/2013 | Brown | G06F 3/0443 |
| | | | 345/174 |
| 2014/0232684 A1* | 8/2014 | Mamba | G06F 3/04182 |
| | | | 345/174 |
| 2015/0145835 A1* | 5/2015 | Vandermeijden | G06F 3/0445 |
| | | | 345/178 |
| 2015/0179122 A1* | 6/2015 | Brown | G06F 3/0443 |
| | | | 345/174 |
| 2015/0346864 A1* | 12/2015 | Yang | G06F 3/04186 |
| | | | 345/174 |
| 2016/0117054 A1* | 4/2016 | Mamba | G06F 3/0418 |
| | | | 345/174 |
| 2017/0024078 A1 | 1/2017 | Bokma et al. | |
| 2018/0113563 A1 | 4/2018 | Shimasaki et al. | |
| 2018/0284925 A1 | 10/2018 | Cho | |

FOREIGN PATENT DOCUMENTS

| | | | |
|---|---|---|---|
| CN | 102855032 A | 1/2013 | |
| CN | 103023476 A | 4/2013 | |
| CN | 103984456 A | 8/2014 | |
| CN | 104063101 A | 9/2014 | |
| CN | 105122191 A | 12/2015 | |
| CN | 105549773 A | 5/2016 | |
| CN | 105844262 A | 8/2016 | |
| CN | 107045401 A | 8/2017 | |
| CN | 107305445 A | 10/2017 | |
| CN | 107624176 A | 1/2018 | |
| CN | 108696271 A | 10/2018 | |
| CN | 109085946 A | 12/2018 | |
| CN | 109189273 A | 1/2019 | |
| CN | 109254687 A | 1/2019 | |
| CN | 109614016 A | 4/2019 | |
| CN | 109752420 A | 5/2019 | |
| CN | 110007809 A | 7/2019 | |
| CN | 110308831 A | 10/2019 | |
| CN | 110471578 A | 11/2019 | |
| CN | 110596761 A | 12/2019 | |
| WO | WO-2013012805 A1 * | 1/2013 | G06F 1/3262 |
| WO | 2018090278 A1 | 5/2018 | |

OTHER PUBLICATIONS

Shenzhen Goodix Technology Co.,Ltd., CN First Office Action, CN202010247812.1, dated Mar. 3, 2021, 42 pgs.

Shenzhen Goodix Technology Co.,Ltd., CN Final Office Action, CN202010247812.1, dated Jul. 1, 2021, 4 pgs.

Xiaoping Weng, Touch sensing technology and its application based on CapSense, Beihang University Press, Oct. 31, 2010, 13 pgs.

Hanwu He, Augmented reality interaction method and implementation, Huazhong University of Science & Technology Press, Dec. 31, 2018, 15 pgs.

\* cited by examiner

CAPACITIVE TOUCH DEVICE AND GESTURE RECOGNITION METHOD THEREOF, CHIP AND STORAGE MEDIUM

CROSS REFERENCE TO RELATED APPLICATIONS

The present application is a continuation of PCT Patent Application No. PCT/CN2020/089433, filed May 9, 2020, which claims priority to Chinese patent application No. 202010247812.1, filed Mar. 31, 2020, each of which is incorporated by reference herein in its entirety.

TECHNICAL FIELD

Embodiments of the present disclosure relate to the field of gesture recognition technology, in particular to a capacitive touch device and a gesture recognition method thereof, a chip and a storage medium.

BACKGROUND

At present, smart wearable devices have entered an explosive period, especially wireless headsets. The functional modules of the wireless headsets are roughly divided into a Bluetooth transmission module, an audio processing module, a power management module, a wear detection module, a gesture recognition module and so on, among which the gesture recognition module is an indispensable part of an excellent wireless headset. In related technologies, there are three mainstream solutions for the gesture recognition module.

1. An accelerometer-sensor (G-sensor) solution, which relies on an acceleration timing detected by the G-sensor to recognize the user's gestures such as click, double click, triple click and the like to the headsets.

2. A pressure sensing solution, which relies on detecting a pressure applied to a headset shell to recognize the user's gestures such as click, double click, triple click, slide, long press and the like.

3. A capacitance sensing solution, which relies on detecting an amount of change in capacitance to recognize the user's various gestures to the headsets.

However, the applicant found that there are at least the following problems in the related technologies: In the first solution, on the one hand, gestures such as slide and long press may not be recognized; on the other hand, violent shaking of the head may lead to an accidental touching of the click gesture, and the accuracy of gesture recognition is relatively low. In the second solution, the assembly process and structure space requirements are relatively high, resulting in a relatively high comprehensive cost. In the third solution, if the headset is stained with water or sweat, the gesture recognition performance is relatively poor, and the recognition accuracy may be affected. For example, a normal click gesture may be mistaken for a touch of the capacitive sensor maintained for a long time because of the water or sweat remaining on the headset, thus being mistaken for a long press gesture. In a case that the user's hand does not touch the headset, but the headset is stained with water or sweat, it may be mistaken for the user touching the headset, thus being mistakenly recognized as a click gesture.

SUMMARY

Some embodiments of this present disclosure aim to provide a capacitive touch device, a gesture recognition method thereof, a chip and a storage medium, which are beneficial to improving the accuracy of gesture recognition.

To solve the above technical problems, some embodiments of the present disclosure provide a gesture recognition method of a capacitive touch device, which includes: sampling a capacitance of a capacitive sensor in the capacitive touch device to acquire a capacitance sampling value corresponding to a current sampling frame of the capacitive sensor; determining a first capacitance value of an interference capacitance caused by a liquid on the capacitive sensor according to the capacitance sampling value and reference information corresponding to the current sampling frame; where when the current sampling frame is a first sampling frame, the reference information is initialization information; when the current sampling frame is not the first sampling frame, the reference information is characteristic information of a previous sampling frame of the current sampling frame; determining a touch state of the capacitive sensor represented by the current sampling frame according to the capacitance sampling value and the first capacitance value of the interference capacitance corresponding to the current sampling frame; and recognizing a gesture of a user on the capacitive touch device according to timing information of the touch state of the capacitive sensor represented by the current sampling frame and a historical touch state of the capacitive sensor.

Some embodiments of the present disclosure further provide a chip, which includes at least one processor; and a memory communicatively connected to the at least one processor; where, the memory stores an instruction executable by the at least one processor, and the instruction is executed by the at least one processor, so that the at least one processor may execute the above-described gesture recognition method of the capacitive touch device.

Some embodiments of the present disclosure further provide a capacitive touch device, which includes the above-described chip.

Some embodiments of the present disclosure further provide a computer-readable storage medium storing a computer program, where the computer program, when executed by a processor, implements the above-described gesture recognition method of the capacitive touch device.

According to some embodiments of the present disclosure, the first capacitance value of the interference capacitance caused by the liquid on the capacitive sensor is determined by combining the capacitance sampling value and the reference information corresponding to the current sampling frame, that is, considering that the liquid contacting the capacitive sensor in the capacitive touch device may cause a capacitance change. The touch state of the capacitive sensor represented by the current sampling frame is determined according to the capacitance sampling value and the first capacitance value of the interference capacitance corresponding to the current sampling frame. That is, when determining the touch state of the capacitive sensor represented by the current sampling frame, the capacitance change which may be caused by the liquid contacting the capacitive sensor in the capacitive touch device is considered at the same time, which is beneficial to eliminating the capacitance interference which may be caused when the liquid contacts the capacitive sensor in the capacitive touch device when determining the touch state, thus improving the accuracy of the determined touch state. Since the accuracy of the determined touch state is improved, it is beneficial to improving the accuracy of the recognized gesture type when a gesture type is further recognized based on the determined touch state.

Further, the reference information includes a referenced touch state and a referenced first capacitance value. When the current sampling frame is the first sampling frame, the initialization information includes an initialized touch state and an initialized first capacitance value; where the referenced touch state is the initialized touch state, and the referenced first capacitance value is the initialized first capacitance value; and when the current sampling frame is not the first sampling frame, the characteristic information of the previous sampling frame of the current sampling frame includes a touch state of the capacitive sensor represented by the previous sampling frame of the current sampling frame and the first capacitance value of the interference capacitance caused by the liquid on the capacitive sensor in the previous sampling frame of the current sampling frame; where the referenced touch state is the touch state of the capacitive sensor represented by the previous sampling frame, and the referenced first capacitance value is the first capacitance value of the interference capacitance caused by the liquid on the capacitive sensor in the previous sampling frame. The specific content of the reference information in two cases of the current sampling frame being the first sampling frame or not the first sampling frame is provided, which facilitates to accurately determine the first capacitance value corresponding to the current sampling frame caused by the liquid on the capacitive sensor in different cases.

Further, determining the first capacitance value of the interference capacitance caused by the liquid on the capacitive sensor according to the capacitance sampling value and the reference information corresponding to the current sampling frame includes: determining a second capacitance value of the interference capacitance caused by the liquid on the capacitive sensor according to the capacitance sampling value corresponding to the current sampling frame when the referenced touch state is a touch; and determining the first capacitance value of the interference capacitance caused by the liquid on the capacitive sensor according to the second capacitance value and the referenced first capacitance value. An implementation method of determining the first capacitance value of the interference capacitance caused by the liquid on the capacitive sensor when the referenced touch state is the touch state is provided, which facilitates to accurately determine the first capacitance value of the interference capacitance caused by the liquid on the capacitive sensor according to the second capacitance value and the referenced first capacitance value when the referenced touch state is the touch.

Further, determining the first capacitance value of the interference capacitance caused by the liquid on the capacitive sensor according to the capacitance sampling value and the reference information corresponding to the current sampling frame includes: determining the first capacitance value of the interference capacitance caused by the liquid on the capacitive sensor according to the capacitance sampling value and the referenced first capacitance value corresponding to the current sampling frame when the referenced touch state is a no touch state. An implementation method of determining the first capacitance value of the interference capacitance caused by the liquid on the capacitive sensor when the referenced touch state is the no touch state is provided, which facilitates to determine the first capacitance value of the interference capacitance directly according to the capacitance sampling value and the referenced first capacitance value when the referenced touch state is the no touch state.

Further, determining the touch state of the capacitive sensor represented by the current sampling frame according to the capacitance sampling value and the first capacitance value of the interference capacitance corresponding to the current sampling frame includes: taking a difference between the capacitance sampling value corresponding to the current sampling frame and a base capacitance value of the capacitive sensor as a capacitance detection value; where the base capacitance value represents a capacitance value of the capacitive sensor acquired by sampling under the condition of no hand touch and no liquid contact; determining a hand capacitance value according to a difference between the capacitance detection value and the first capacitance value of the interference capacitance; where the hand capacitance value is configured to represent a capacitance change value caused by a hand on the capacitive sensor; and determining the touch state of the capacitive sensor represented by the current sampling frame according to the hand capacitance value. Through a determined hand capacitance value, it is beneficial to accurately acquire an amount of a capacitance change caused by hand touching the capacitive sensor in the capacitive touch device except the first capacitance value of the interference capacitance caused by the liquid, so that the touch state of the capacitive sensor represented by the current sampling frame may be accurately determined based on the acquired hand capacitance value.

BRIEF DESCRIPTION OF THE DRAWINGS

One or more embodiments are described as examples with reference to the corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

Embodiments of the present disclosure will be described in detail below with reference to the accompanying drawings in order to make the objectives, technical solutions and advantages of the present disclosure clearer. However, it will be apparent to those skilled in the art that, in the various embodiments of the present disclosure, numerous technical details are set forth in order to provide the reader with a better understanding of the present disclosure. However, the technical solutions claimed in the present disclosure may be implemented without these technical details and various changes and modifications based on the following embodiments. The following embodiments are divided for convenience of description, and should not constitute any limitation to the specific implementation of the present disclosure. The various embodiments may be combined with each other and referred to each other on the premise of no contradiction.

Figure 1:
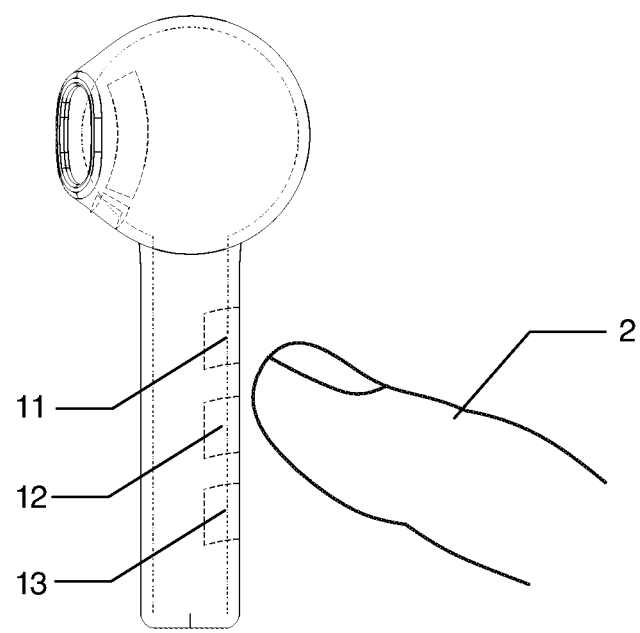
FIG. 1 is a schematic diagram of a wireless headset according to a first embodiment of the present disclosure.

A first embodiment of the present disclosure relates to a gesture recognition method of a capacitive touch device. The capacitive touch device may be a wireless headset as shown in FIG. 1, and a user's gesture to the wireless headset may be recognized through the gesture recognition method. For example, recognized gestures may include: a click, a double click, a left-and-right slide, an up-and-down slide, a long press and the like. The wireless headset in FIG. 1 is provided with three capacitive sensors, namely a capacitive sensor 11, a capacitive sensor 12 and a capacitive sensor 13. When the user's finger 2 touches the above-described capacitive sensors, the wireless headset may recognize the user's gesture. For example, if a touch state of the capacitive sensor 11 at a previous moment of a current moment is a no touch state and a touch state of the capacitive sensor 11 at the current moment is a touch state, a click gesture on the wireless headset may be recognized. It should be noted that the number of the capacitive sensors in FIG. 1 is only three, and the specific implementation is not limited thereto. Optionally, the capacitive touch device may also be a capacitive touch display screen, and a gesture type of the user to the capacitive touch display screen may be recognized through the gesture recognition method. However, this embodiment only provides specific examples of the above two capacitive touch devices, and the specific implementation is not limited thereto. The implementation details of the gesture recognition method in this embodiment are described in detail below. The following contents are only for convenience of understanding the implementation details provided, and are not necessary for implementing the present solution.

Figure 2:
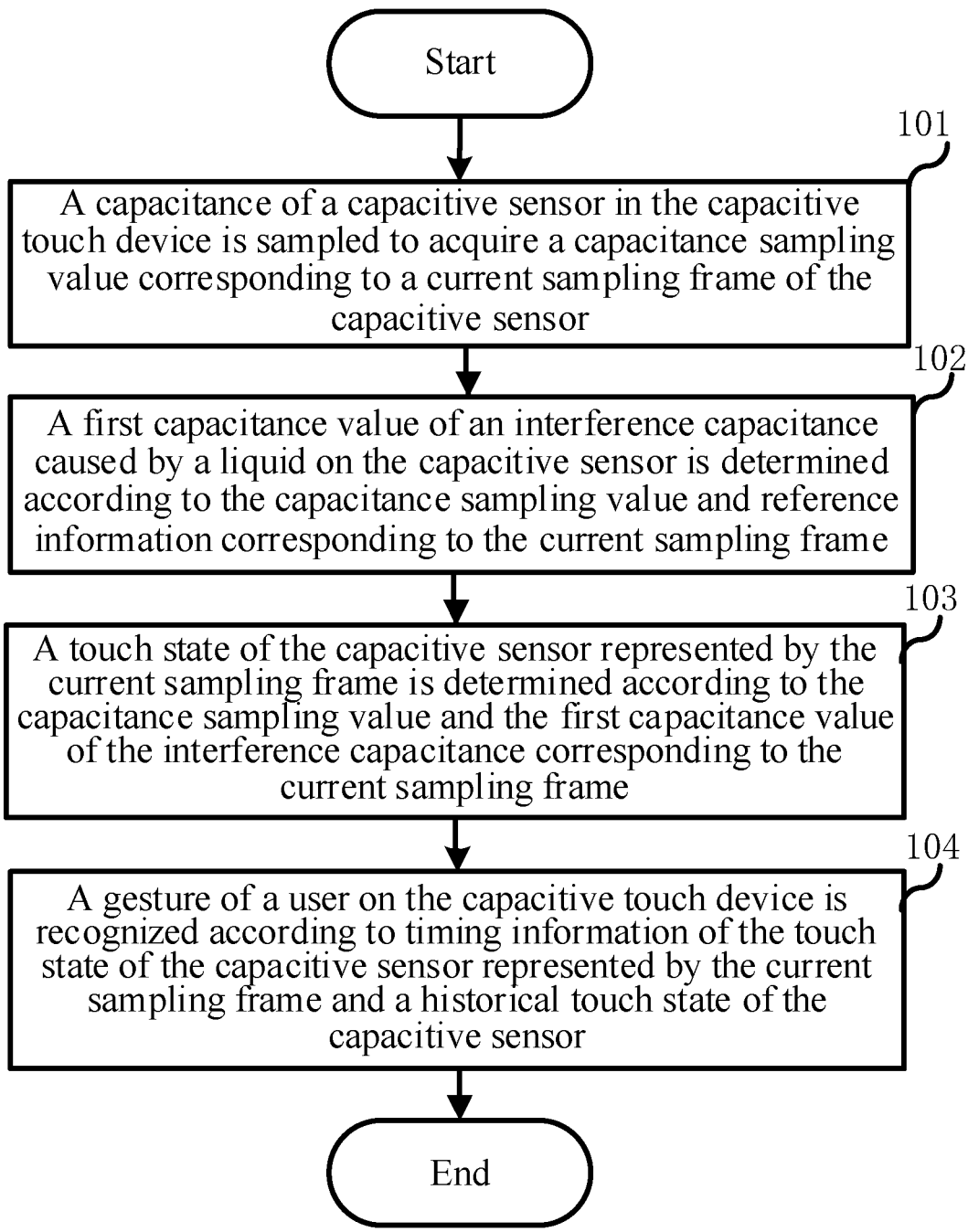
FIG. 2 is a flowchart of a gesture recognition method of a capacitive touch device according to the first embodiment of the present disclosure.

A flow chart of the gesture recognition method in this embodiment may be shown in FIG. 2, and specifically includes:

In step 101, a capacitance of a capacitive sensor in the capacitive touch device is sampled to acquire a capacitance sampling value corresponding to a current sampling frame of the capacitive sensor.

In an example, a sampling period may be preset. The capacitance of the capacitive sensor in the capacitive touch device may be sampled according to the preset sampling period to acquire the capacitance sampling value corresponding to the current sampling frame of the capacitive sensor. The capacitance sampling value corresponding to each sampling frame may be the capacitance sampling value acquired by sampling at each sampling moment. It can be understood that if the capacitive touch device includes a plurality of capacitive sensors, capacitances of the plurality of capacitive sensors may be sampled according to the sampling period, so as to acquire capacitance sampling values of the plurality of capacitive sensors corresponding to the current sampling frame.

Herein, when there is no touch object close to the capacitive sensor, that is, when there is no hand touch and no liquid contact, the capacitance sampling value may be called a base capacitance value BaseC. When a touch object (such as a finger) is in contact with the capacitive sensor, a sampled capacitance value may be called a capacitance sampling value RawC. Herein, the capacitance sampling value RawC may include two parts: a capacitance value caused by the contact of the touch object and the base capacitance value. A difference between the capacitance sampling value RawC corresponding to the current sampling frame and the base capacitance value BaseC of the capacitive sensor may be called a capacitance detection value Touch C, that is, Touch C=RawC−BaseC. It should be noted that the capacitance detection value Touch C is RawC−BaseC in this embodiment is only taken as an example. According to actual needs, the capacitance sampling value RawC may also be directly used as the capacitance detection value Touch C. However, this embodiment is not specifically limited thereto. When the touch object includes a liquid and a finger, that is, when the liquid contacts the capacitive touch device, a user touches the capacitive sensor in the capacitive touch device with the finger, then the capacitance detection value Touch C may include an amount of a capacitance change caused by the liquid contacting the capacitive sensor and an amount of a capacitance change caused by the finger touching the capacitive sensor. Herein, the liquid may be a water drop, a sweat, a beverage and the like.

In a specific implementation, before sampling the capacitance of the capacitive sensor in the capacitive touch device, a power-on initialization may be performed first, for example, an initialization is performed using preset initialization information. Herein, the initialization information may include an initialized base capacitor value BaseC, an initialized touch state, and the like. In a specific implementation, the initialized touch state may be a no touch or a touch.

In step 102, a first capacitance value of an interference capacitance caused by a liquid on the capacitive sensor is determined according to the capacitance sampling value and reference information corresponding to the current sampling frame.

Herein, when the current sampling frame is a first sampling frame, the reference information is the initialization information. When the current sampling frame is not the first sampling frame, the reference information is characteristic information of a previous sampling frame of the current sampling frame. That is, when the current sampling frame is the first sampling frame, the first capacitance value of the interference capacitance caused by the liquid on the capacitive sensor is determined according to the capacitance sampling value corresponding to the current sampling frame and the initialization information. When the current sampling frame is not the first sampling frame, the first capacitance value of the interference capacitance caused by the liquid on the capacitive sensor is determined according to the capacitance sampling value corresponding to the current sampling frame and the characteristic information of the previous sampling frame. Since the characteristic information of the previous sampling frame may be considered when determining the first capacitance value of the interference capacitance caused by the liquid on the capacitive sensor in the case that the current sampling frame is not the first sampling frame, it may be deemed that characteristic information of a historical sampling frame is taken into consideration for the first capacitance value of the interference capacitance. In a specific implementation, the first capacitance value of the interference capacitance caused by the liquid on the capacitive sensor may be understood as the amount of the capacitance change of the capacitive sensor caused by the liquid when the liquid contacts the capacitive sensor at a current sampling moment.

In an example, the reference information includes a referenced touch state and a referenced first capacitance value. The reference information in two cases where the current sampling frame is the first sampling frame and where the current sampling frame is not the first sampling frame will be respectively described below.

When the current sampling frame is the first sampling frame, the initialization information includes an initialized touch state and an initialized first capacitance value. The referenced touch state is the initialized touch state, and the referenced first capacitance value is the initialized first capacitance value. In a specific implementation, the initialized touch state may usually be the no touch, and the initialized first capacitance value may be set to 0, but this embodiment is not specifically limited thereto.

When the current sampling frame is not the first sampling frame, the characteristic information of the previous sampling frame of the current sampling frame includes: a touch state of the capacitive sensor represented by the previous sampling frame of the current sampling frame and the first capacitance value of the interference capacitance caused by the liquid on the capacitive sensor in the previous sampling frame of the current sampling frame. The referenced touch state is the touch state of the capacitive sensor represented by the previous sampling frame, and the referenced first capacitance value is the first capacitance value of the interference capacitance caused by the liquid on the capacitive sensor in the previous sampling frame.

In an example, each sampling frame has a touch state of a capacitive sensor represented. Each time when a touch state represented by a sampling frame is acquired, the touch state represented by the sampling frame may be recorded, so as to facilitate a subsequent acquisition of the touch state of the capacitive sensor represented by the previous sampling frame of the current sampling frame. In a specific implementation, timing information of the touch states of the touch device may be acquired according to the recorded touch states. The touch states may be divided into two types, namely the touch and the no touch. According to the timing information of the touch states, the touch state represented by the previous sampling frame of the current sampling frame may also be determined.

In an example, each sampling frame has a first capacitance value of the interference capacitance caused by the liquid on the capacitive sensor, that is, it may be deemed that each sampling frame has a corresponding first capacitance value of the interference capacitance. After acquiring a first capacitance value of the interference capacitance corresponding to a sampling frame each time, the first capacitance value of the interference capacitance corresponding to the sampling frame may be recorded, so as to facilitate a subsequent acquisition of the first capacitance value of the interference capacitance corresponding to the previous sampling frame of the current sampling frame, that is, the first capacitance value of the interference capacitance caused by the liquid on the capacitive sensor in the previous sampling frame of the current sampling frame.

Figure 3:
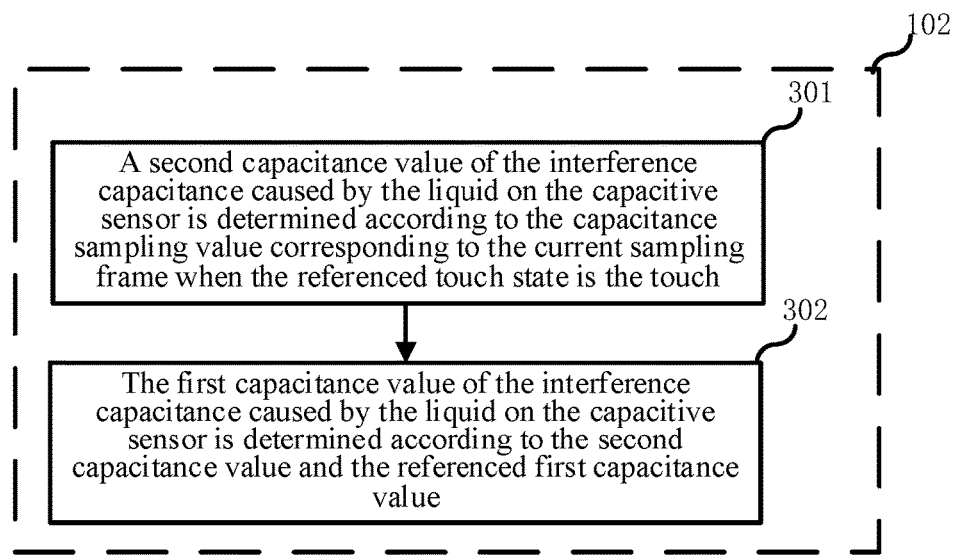
FIG. 3 is a flowchart of sub-steps of step 102 in the first embodiment of the present disclosure.

In an example, an implementation process of the step 102 is shown in FIG. 3, which includes:

In step 301, a second capacitance value of the interference capacitance caused by the liquid on the capacitive sensor is determined according to the capacitance sampling value corresponding to the current sampling frame when the referenced touch state is the touch.

That is, when the referenced touch state included in the reference information is the touch, the second capacitance value of the interference capacitance caused by the liquid on the capacitive sensor is determined according to the capacitance sampling value corresponding to the current sampling frame. In a specific implementation, the referenced touch state is the touch, which may indicate that the initialized touch state is the touch, or that the touch state of the capacitive sensor represented by the previous sampling frame of the current sampling frame is the touch.

Herein, a difference between the first capacitance value of the interference capacitance and the second capacitance value of the interference capacitance lies in the different determination methods: the second capacitance value is acquired by performing calculation based on characteristic information of the current sampling frame. That is, the second capacitance value is not relevant with the characteristic information of the historical sampling frame and may be recorded as water_signal_temp. That is, the second capacitance value is acquired according to the capacitance sampling value corresponding to the current sampling frame. The first capacitance value is acquired by iteratively estimating based on the characteristic information of the current sampling frame and the characteristic information of the historical sampling frame, that is, the first capacitance value is related to the characteristic information of the historical sampling frame and may be recorded as water_signal. Herein, the first capacitance value of the interference capacitance caused by the liquid on the capacitive sensor when the current sampling frame is the first sampling frame is determined based on the capacitance sampling value corresponding to the current sampling frame and the initialized information. Herein, the initialized information may include the initialized touch state and the initialized first capacitance value.

In an example, a difference between the capacitance sampling value corresponding to the current sampling frame and the base capacitance value of the capacitive sensor may be taken as the capacitance detection value. Herein, the base capacitance value represents a capacitance value of the capacitive sensor under the condition of no hand touch and no liquid contact. Then whether the capacitance detection value is greater than a preset capacitance threshold is determined. The preset capacitance threshold is larger than a touch threshold of the capacitive sensor. When it is determined that the capacitance detection value is greater than the preset capacitance threshold, a difference between the capacitance detection value and the preset capacitance threshold is taken as the second capacitance value of the interference capacitance caused by the liquid on the capacitive sensor. When it is determined that the capacitance detection value is less than or equal to the preset threshold, an initialized second capacitance value is taken as the second capacitance value of the interference capacitance caused by the liquid on the capacitive sensor. Herein, the touch threshold is a threshold of a capacitance value configured to indicate that the touch state of the capacitive sensor is the touch state when there is no liquid on the capacitive sensor. For example, in a normal state, that is, when there is no liquid on the capacitive sensor, if the capacitance detection value Touch C is greater than the touch threshold, it is determined that the touch state of the capacitive sensor is the touch. The above touch threshold may be set according to actual needs. For example, the touch threshold may be preset by a technician before the capacitive sensor in the capacitive touch device leaves the factory for determining the touch state in the normal state. The normal state may be understood as the state in which there is no liquid, that is, the capacitance detection value Touch C does not include the amount of the capacitance change caused when the liquid contacts the capacitive sensor. The above preset capacitance threshold may be set to a value greater than the touch threshold according to actual needs, for example, the preset threshold may be a product of the touch threshold and a preset gain coefficient, and the gain coefficient is greater than 1.

In a specific implementation, when determining the second capacitance value of the interference capacitance caused by the liquid on the capacitive sensor, that is, the second capacitance value water_signal_temp corresponding to the current sampling frame, the water_signal_temp may be initialized to 0 first. If it is determined that the Touch C of the current sampling frame is greater than K1×Touch_Level (the product of the gain coefficient K1 and the touch threshold Touch_Level), a value of the Touch C-K1× Touch_Level may be taken as the second capacitance value corresponding to the current sampling frame. Otherwise, the initialized second capacitance value may be taken as the second capacitance value of the interference capacitance caused by the liquid on the capacitive sensor. The initialized second capacitance value may be 0. However, the initialized second capacitance value in this embodiment only takes 0 as an example, which is not limited thereto in the specific implementations.

In step 302, the first capacitance value of the interference capacitance caused by the liquid on the capacitive sensor is determined according to the second capacitance value and the referenced first capacitance value.

In a specific implementation, if the current sampling frame is the first sampling frame, the referenced first capacitance value is the initialized first capacitance value, for example, it may be 0. If the current sampling frame is not the first sampling frame, the referenced first capacitance value is the first capacitance value of the interference capacitance caused by the liquid on the capacitive sensor in the previous sampling frame of the current sampling frame.

In an example, it may be judged whether the second capacitance value is greater than the referenced first capacitance value. When it is determined that the second capacitance value is greater than the referenced first capacitance value, the second capacitance value is taken as the first capacitance value of the interference capacitance caused by the liquid on the capacitive sensor. When it is determined that the second capacitance value is less than or equal to the referenced first capacitance value, the referenced first capacitance value is attenuated and a value after attenuating of the referenced first capacitance value is taken as the first capacitance value of the interference capacitance caused by the liquid on the capacitive sensor. It may be understood that if no liquid actually contacts the capacitive sensor in the capacitive touch device in actual situations, the determined first capacitance value of the interference capacitance caused by the liquid on the capacitive sensor is 0.

Herein, the method of attenuating the referenced first capacitance value may be: multiplying the referenced first capacitance value by an attenuation coefficient, and then taking a multiplied product as the first capacitance value corresponding to the current sampling frame, where the attenuation coefficient is less than 1. However, the attenuation method in this embodiment only takes the above example as an example, which is not limited thereto in the specific implementation. For example, when the referenced first capacitance value is not 0, the referenced first capacitance value may be attenuated by subtracting a preset value from the referenced first capacitance value.

Taking an example that the current sampling frame is not the first sampling frame, it is assumed that the current sampling frame is a 10th frame and the previous sampling frame of the current sampling frame is a 9th frame. A first capacitance value corresponding to the current sampling frame, i.e., the 10th frame may be determined in such a way that if a second capacitance value water_signal_temp corresponding to the 10th frame is larger than a first capacitance value water_signal corresponding to the 9th frame, then the first capacitance value corresponding to the 10th frame is equal to the second capacitance value corresponding to the 10th frame. If the second capacitance value corresponding to the 10th frame is less than or equal to the first capacitance value corresponding to the 9th frame, the first capacitance value corresponding to the 10th frame is equal to a product of the first capacitance value corresponding to the 9th frame and an attenuation coefficient K2, where K2 is less than 1.

It may be understood that the above FIG. 3 mainly introduces how to determine the first capacitance value of the interference capacitance caused by the liquid on the capacitive sensor when the referenced touch state is the touch. The following describes how to determine the first capacitance value of the interference capacitance caused by the liquid on the capacitive sensor when the referenced touch state is the no touch state.

In an example, when the referenced touch state is the no touch state, the first capacitance value of the interference capacitance caused by the liquid on the capacitive sensor may be determined according to the capacitance sampling value and the referenced first capacitance value corresponding to the current sampling frame. Herein, if the current sampling frame is the first sampling frame, the referenced first capacitance value is the initialized first capacitance value, for example, it may be 0. If the current sampling frame is not the first sampling frame, the referenced first capacitance value is the first capacitance value of the interference capacitance caused by the liquid on the capacitive sensor in the previous sampling frame of the current sampling frame.

In an example, according to the capacitance sampling value and the referenced first capacitance value corresponding to the current sampling frame, the way to determine the first capacitance value of the interference capacitance caused by the liquid on the capacitive sensor may be as follows: first, the difference between the capacitance sampling value corresponding to the current sampling frame and the base capacitance value of the capacitive sensor may be taken as the capacitance detection value, where the base capacitance value represents the capacitance value of the capacitive sensor under the condition of no hand touch and no liquid contact. Then, whether the capacitance detection value is greater than the referenced first capacitance value is judged. When it is determined that the capacitance detection value is greater than the referenced first capacitance value, the referenced first capacitance value is taken as the first capacitance value of the interference capacitance caused by the liquid on the capacitive sensor; and when it is determined that the capacitance detection value is less than or equal to the referenced first capacitance value, the capacitance detection value is taken as the first capacitance value corresponding to the current sampling frame.

Taking the current sampling frame as the 10th frame as an example, the first capacitance value corresponding to the 10th frame may be determined by judging whether a capacitance detection value Touch C of the 10th frame is greater than the first capacitance value water_signal corresponding to the 9th frame. If the Touch C of the 10th frame is greater than the water_signal corresponding to the 9th frame, then the water_signal corresponding to the 10th frame is equal to the water_signal corresponding to the 9th frame; otherwise, the water_signal corresponding to the 10th frame is equal to the Touch C of the 10th frame.

Optionally, when the referenced touch state is the no touch state, the way to determine the first capacitance value of the interference capacitance caused by the liquid on the capacitive sensor may also be as follows: first, the difference between the capacitance sampling value corresponding to the current sampling frame and the base capacitance value of the capacitive sensor is taken as the capacitance detection value, and the second capacitance value of the interference capacitance caused by the liquid on the capacitive sensor is determined according to the capacitance detection value. In a specific implementation, the capacitance detection value may be directly taken as the second capacitance value. Then, according to the second capacitance value and the referenced first capacitance value, the first capacitance value of the interference capacitance caused by the liquid on the capacitive sensor is determined. For example, if the second capacitance value is greater than the referenced first capacitance value, the referenced first capacitance value is taken as the first capacitance value of the interference capacitance caused by the liquid on the capacitive sensor; and if the second capacitance value is less than or equal to the referenced first capacitance value, the second capacitance value is taken as the first capacitance value of the interference capacitance caused by the liquid on the capacitive sensor.

In step 103, a touch state of the capacitive sensor represented by the current sampling frame is determined according to the capacitance sampling value and the first capacitance value of the interference capacitance corresponding to the current sampling frame.

In an example, the difference between the capacitance sampling value corresponding to the current sampling frame and the base capacitance value of the capacitive sensor may be taken as the capacitance detection value first. A hand capacitance value is determined according to a difference between the capacitance detection value and the first capacitance value of the interference capacitance; where the hand capacitance value is configured to represent a capacitance change value caused by a hand on the capacitive sensor. Then, the touch state of the capacitive sensor represented by the current sampling frame is determined according to the hand capacitance value.

In an example, the hand capacitance value may be compared with the touch threshold of the capacitive sensor in the capacitive touch device, and the touch state of the capacitive sensor represented by the current sampling frame may be determined according to the comparison result. For example, if the hand capacitance value is greater than the touch threshold, it may be determined that the touch state of the capacitive sensor represented by the current sampling frame is the touch; otherwise, it may be determined that the touch state of the capacitive sensor represented by the current sampling frame is the no touch state.

In step 104, a gesture of a user on the capacitive touch device is recognized according to timing information of the touch state of the capacitive sensor represented by the current sampling frame and a historical touch state of the capacitive sensor.

That is to say, the gesture type is comprehensively determined by combining touch states of a current time point and a historical time point, that is, by combining the touch states of different time points. It may be understood that if the capacitive touch device includes a plurality of capacitive sensors, each capacitive sensor may have timing information of a touch state, and the timing information is used to represent the touch state of the capacitive sensor at different sampling time points. In a specific implementation, the timing information of the historical touch state may be expressed as a timing diagram of the touch state drawn according to the recorded touch state. Then, the timing information of the touch state of the capacitive sensor in the capacitive touch device may be combined to recognize the gesture type. Herein, the recognized gesture type may be any one of the following: a click, a double click, a triple click, a slide, a long press and the like. For example, in FIG. 1, the capacitive sensors 11, 12, and 13 are detected to have the touch in time sequence, which may be recognized as the user's gesture of sliding up and down.

Figure 4:
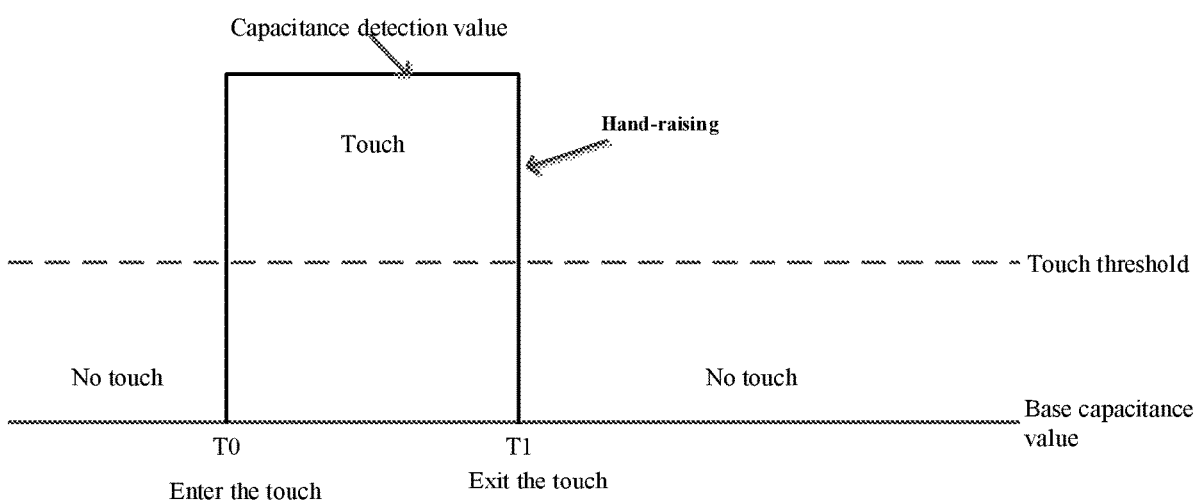
FIG. 4 is a schematic diagram of a relationship between a capacitance detection value of a capacitive sensor and a touch state according to the first embodiment of this present disclosure.

In an example, referring to FIG. 4, a touch state between a time point T0 and a time point T1 is the touch. If an interval duration between the T0 and the T1 is relatively short, it may be determined that the gesture type is the click, and if the interval duration between the T0 and the T1 is relatively long, it may be determined that the gesture type is the long press. Herein, a length of the interval duration may be determined by pre-setting a duration threshold. For example, if the interval duration is greater than the duration threshold, it may be determined that the interval duration is relatively long; and if the interval duration is less than the duration threshold, it may be determined that the interval duration is relatively short. Referring to FIG. 4, it may be seen that the touch threshold is larger than the base capacitance value.

In the specific implementation, assuming that there is a touch state between T0 and T1, a no touch between T1 and T2, a touch between T2 and T3, and a no touch after T3, and interval durations between T0 to T1, T1 to T2 and T2 to T3 are relatively short, it may be recognized that the gesture type is the double click. Further, the gesture of the slide may be determined according to the timing information of the touch states of the plurality of capacitive sensors. For example, if the touch states of the three capacitive sensors are determined to be the touch in time sequence, the gesture type may be determined to be the slide, that is, the user's finger slide over the three capacitive sensors in turn.

It should be noted that the above examples in this embodiment are all examples for convenience of understanding, and do not limit the technical solution of the present disclosure.

According to this embodiment, the first capacitance value of the interference capacitance caused by the liquid on the capacitive sensor is determined by combining the capacitance sampling value and the reference information corresponding to the current sampling frame, that is, it is considered that the liquid contacting the capacitive sensor in the capacitive touch device may cause a capacitance change. The touch state of the capacitive sensor represented by the current sampling frame is determined according to the capacitance sampling value and the first capacitance value of the interference capacitance corresponding to the current sampling frame. That is, when determining the touch state of the capacitive sensor represented by the current sampling frame, it is considered that the liquid contacting the capacitive sensor in the capacitive touch device may cause the capacitance change at the same time, which is beneficial to eliminating the capacitance interference which may be caused when the liquid contacts the capacitive sensor in the capacitive touch device when determining the touch state, thus improving the accuracy of the determined touch state. Since the accuracy of the determined touch state is improved, it is beneficial to improving the accuracy of the recognized gesture type when the gesture type is further recognized based on the determined touch state. Further, the capacitive gesture recognition solution adopted in the embodiment of the present disclosure is beneficial to recognizing various gestures, and the capacitive gesture recognition solution merely needs to attach the capacitive sensor on an inner side of the capacitive touch device in terms of hardware, so its comprehensive cost is relatively low. Further, for the existing capacitive touch device, the gesture recognition method in this embodiment may be achieved just by upgrading a firmware through an over-the-air technology (OTA) without adding additional hardware, which is conducive to improving compatibility while avoiding increasing cost.

A second embodiment of the present disclosure relates to a gesture recognition method of a capacitive touch device. The second embodiment is roughly the same as the first embodiment, with the main difference being that the way to determine a touch state is different. In the first embodiment, the capacitive sensor in the capacitive touch device has a threshold, that is, the touch threshold, and the touch state of the capacitive sensor represented by the current sampling frame is determined according to a comparison relationship between the touch threshold and the hand capacitance value. In the second embodiment, the capacitive sensor in the capacitive touch device has two thresholds, namely a touch threshold and a hand-raising threshold, and the touch state is determined by combining the referenced touch state and the two thresholds. Herein, the touch threshold is greater than the hand-raising threshold, and both the touch threshold and the hand-raising threshold may be preset by a technician before the capacitive sensor leaves the factory. The touch threshold is a threshold of a capacitance value configured to indicate that the touch state of the capacitive sensor is the touch state when there is no liquid on the capacitive sensor, and the hand-raising threshold is a threshold of a capacitance value configured to indicate that the touch state of the capacitive sensor is the no touch state when there is no liquid on the capacitive sensor. That is to say, in the normal state, i.e., when there is no liquid on the capacitive sensor, if the Touch C is greater than the touch threshold, it is determined that the touch state is the touch; and if the Touch C is less than the hand-raising threshold, it may be determined that the touch state is the no touch state. In a specific implementation, the hand-raising threshold of the capacitive sensor is greater than the base capacitance value of the capacitive sensor.

Figure 5:
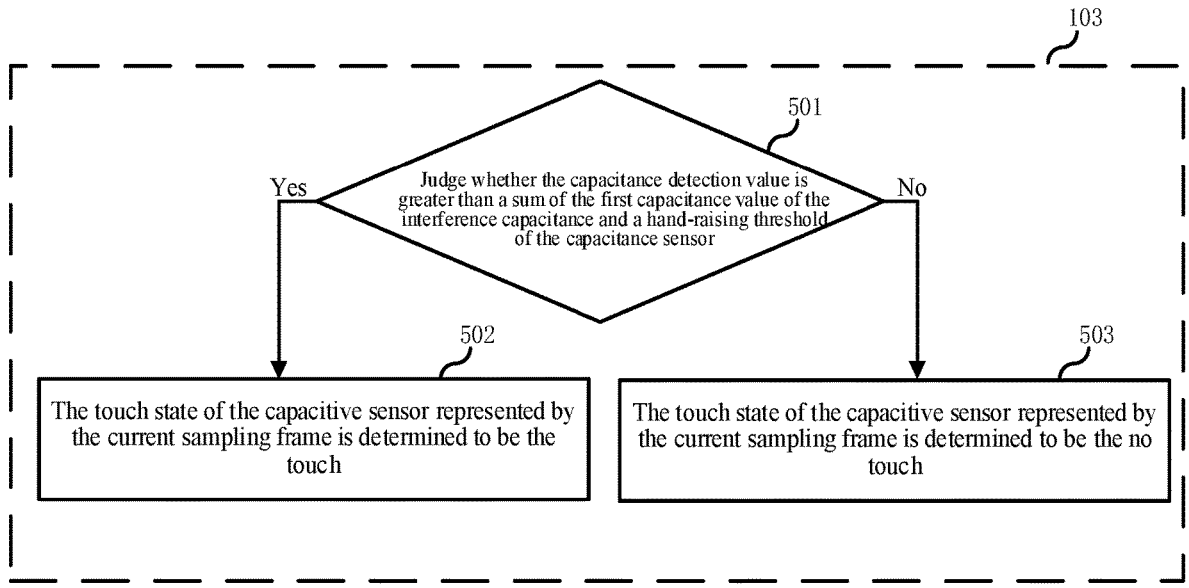
FIG. 5 is a flowchart of sub-steps of step 103 according to an example in a second embodiment of the present disclosure.

First, how to determine the touch state of the capacitive sensor represented by the current sampling frame when the referenced touch state is the touch state is described below. FIG. 5 may be regarded as sub-steps of the step 103 in an example, including:

In step 501, it is judged that whether the capacitance detection value is greater than a sum of the first capacitance value of the interference capacitance and a hand-raising threshold of the capacitive sensor; if so, step 502 is executed, otherwise step 503 is executed.

Herein, the Touch C represents the capacitance detection value, which is the difference between the capacitance sampling value corresponding to the current sampling frame and the base capacitance value of the capacitive sensor. If Leava_Level represents the hand-raising threshold, and water_signal represents the first capacitance value of the interference capacitance, it may be judged whether the condition of Touch C>Leava_Level+water_signal is true. If it is true, go to step 502, otherwise go to step 503.

In step 502, the touch state of the capacitive sensor represented by the current sampling frame is determined to be the touch.

That is to say, when the condition of Touch C>Leava_Level+water_signal is true, it is determined that the touch state of the capacitive sensor represented by the current sampling frame is the touch.

In step 503, the touch state of the capacitive sensor represented by the current sampling frame is determined to be the no touch.

That is to say, when the condition of Touch C>Leava_Level+water_signal is not true, it is determined that the touch state of the capacitive sensor represented by the current sampling frame is the no touch state. That is, the touch state of the capacitive sensor switches from the referenced touch state, that is, the touch to the no touch starting from the current sampling frame.

Figure 6:
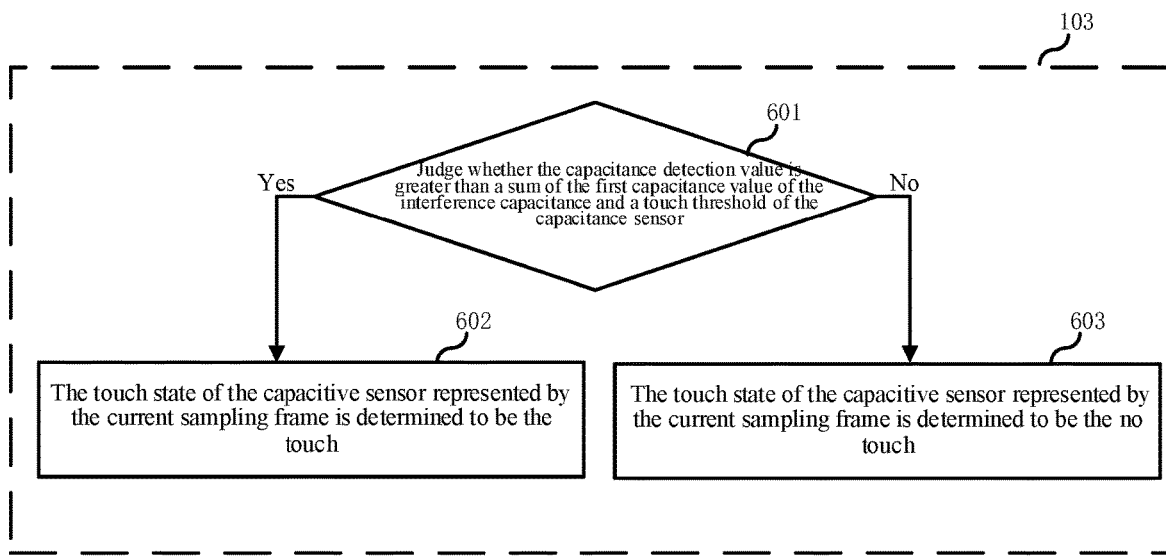
FIG. 6 is a flowchart of sub-steps of step 103 according to another example in the second embodiment of the present disclosure.

Then, how to determine the touch state of the capacitive sensor represented by the current sampling frame when the referenced touch state is the no touch state is described below. FIG. 6 may be regarded as sub-steps of the step 103 in another example, including:

In step 601, it is judged that whether the capacitance detection value is greater than a sum of the first capacitance value of the interference capacitance and a touch threshold of the capacitive sensor; if so, step 602 is executed, otherwise step 603 is executed.

Herein, the Touch C represents the capacitance detection value, the Touch_Level represents the touch threshold, and the water_signal represents the first capacitance value corresponding to the current sampling frame, then it may be judged whether the condition of Touch C>Touch_Level+water_signal is true. If it is true, go to step 602, otherwise go to step 603.

In step 602, the touch state of the capacitive sensor represented by the current sampling frame is determined to be the touch.

That is to say, when the condition of Touch C>Touch_Level+water_signal is true, it is determined that the touch state of the capacitive sensor represented by the current sampling frame is the touch. That is, the touch state of the capacitive sensor switches from the referenced touch state, that is, the no touch to the touch starting from the current sampling frame.

In step 603, the touch state of the capacitive sensor represented by the current sampling frame is determined to be the no touch.

That is to say, when the condition of Touch C>Touch_Level+water_signal is not true, it is determined that the touch state of the capacitive sensor represented by the current sampling frame is the no touch state.

Figure 7:
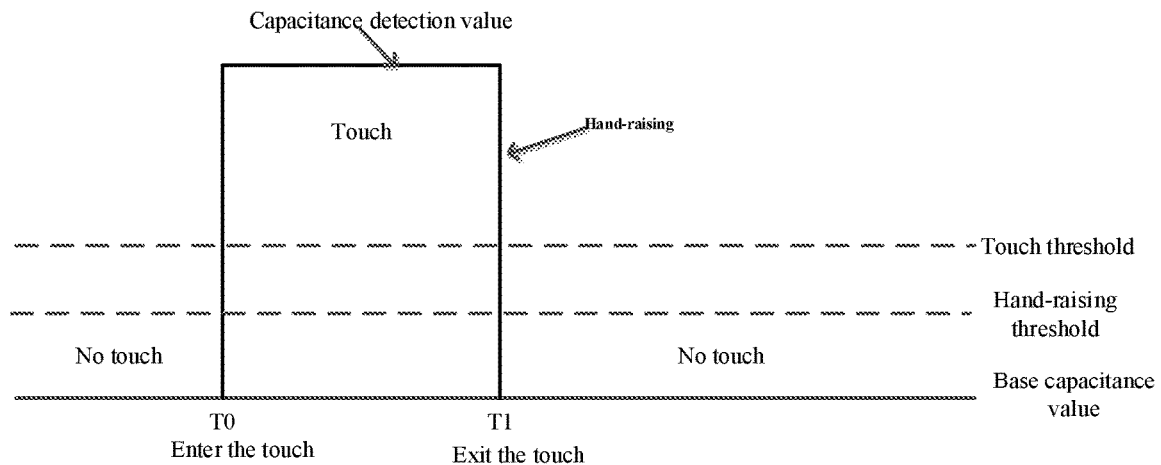
FIG. 7 is a schematic diagram of a relationship between a capacitance detection value of a capacitive sensor and a touch state according to the second embodiment of the present disclosure.

In an example, the determined first capacitance value of the interference capacitance caused by the liquid on the capacitive sensor is 0, that is, there is no liquid interference, which belongs to the normal state. The capacitance detection value Touch C corresponding to the current sampling frame may be regarded as the hand capacitance value. FIG. 7 shows a schematic diagram of the relationship between touch state and the capacitance detection value. The Touch C is less than the hand-raising threshold before the time point T0, then it may be determined that the touch state before the time point T0 is the no touch state. The touch C is greater than the touch threshold between the time point T0 and the time point T1, then it may be determined that the touch state between the time point T0 and the time point T1 is the touch. The touch C is less than the hand-raising threshold after the time point T1, then it may be determined that the touch state after the time point T1 is the no touch state. That is, the touch is entered from the time point T0 until the time point T1 when the touch state is exited and the no touch is entered. Referring to FIG. 7, it may be seen that the touch threshold is greater than the hand-raising threshold, and the hand-raising threshold is greater than the base capacitance value.

Figure 8:
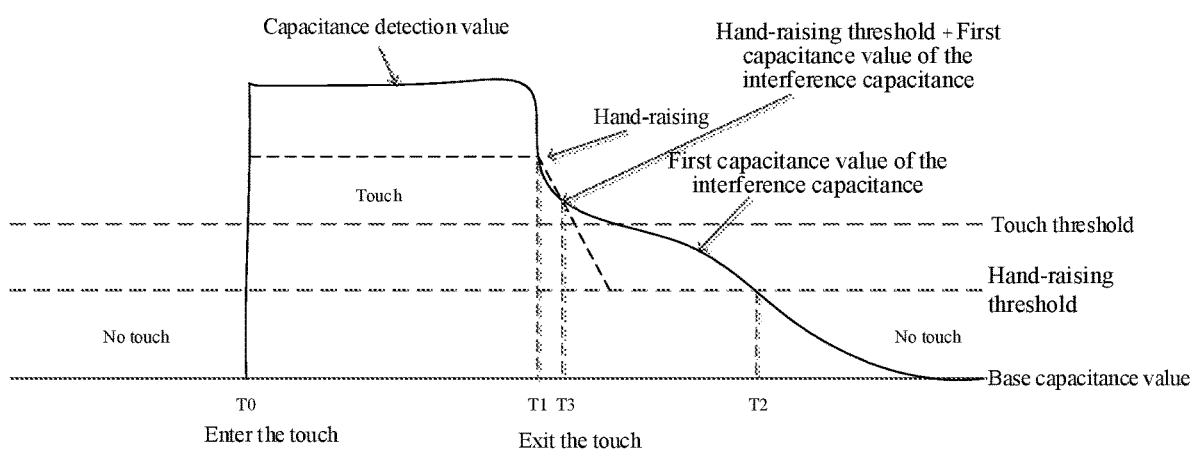
FIG. 8 is a schematic diagram of switching from a touch to a no touch according to the second embodiment of the present disclosure.
Figure 9:
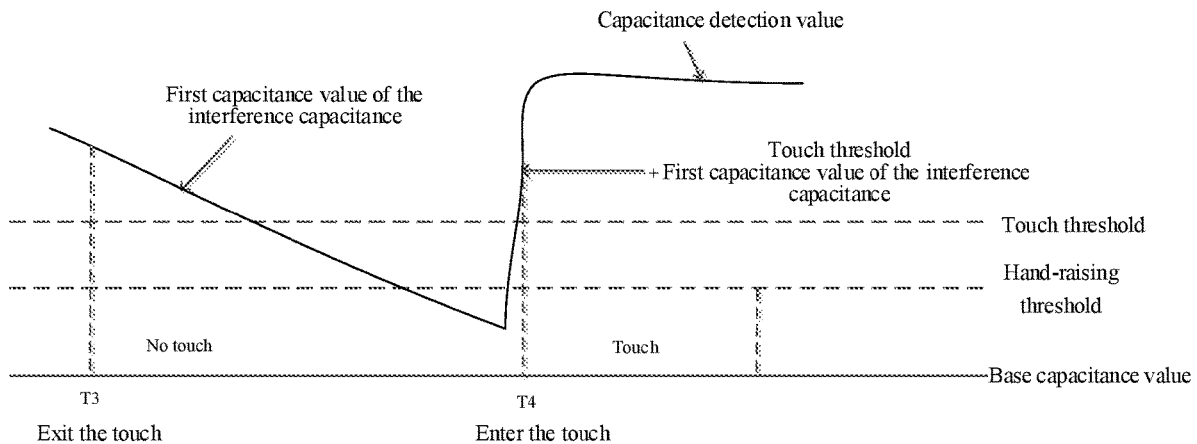
FIG. 9 is a schematic diagram of switching from the no touch to the touch according to the second embodiment of the present disclosure.

In another example, the determined first capacitance value of the interference capacitance caused by the liquid on the capacitive sensor is greater than 0, that is, there is a liquid interference. The touch C includes the first capacitance value of the interference capacitance and the hand capacitance value. FIG. 8 shows a schematic diagram of switching from the touch to the no touch, in a case that the referenced touch state is the touch. From the time point T0 to a time point T3, a condition of Touch C>Leava_Level (the hand-raising threshold)+water_signal (the first capacitance value of the interference capacitance) is satisfied, then it may be determined that the touch state between the time point T0 and the time point T3 is the touch. After the time point T3, since the condition of the Touch C>Leava_Level+water_signal is not satisfied, it may be determined that the touch state is switched to the no touch from the time point T3. FIG. 9 shows a schematic diagram of switching from the no touch to the touch, in a case that the referenced touch state is the no touch state. A touch state between the time point T3 and a time point T4 is the no touch state, and a condition of Touch C>Touch_Level (touch threshold)+water_signal is satisfied from the time point T4, then it may be determined that the touch state is switched to the no touch from the time point T4.

Figure 10:
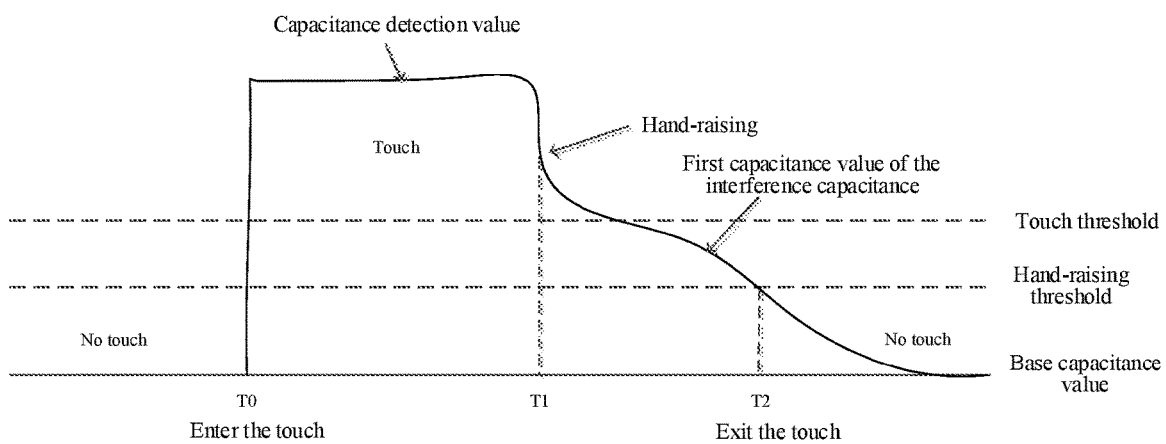
FIG. 10 is a schematic diagram of judging the touch and the no touch by logic in a conventional state according to the second embodiment of the present disclosure.

It may be understood that if the touch and the no touch are determined by the logic of the normal state, the liquid interference may lead to an error in a state switching logic. As shown in FIG. 10, when the hand is raised at the moment of T1, the touch should be exited and switched to the no touch, which is delayed until the moment of T2 to exit. The state switching error may directly cause a gesture recognition error. For example, a normal click gesture may be mistaken for a long press because of the touch for a long time. For another example, when there is no hand pressing but water or sweat drops on a surface of a capacitive sensor housing, a click gesture is triggered by mistake.

The capacitive sensor in the capacitive touch device in this embodiment has two thresholds, namely the touch threshold and the hand-raising threshold. By setting two different thresholds, that is, the touch threshold and the hand-raising threshold, it is beneficial to prevent the touch state from frequently switching between the touch and the no touch and an occurrence of state jitter, which is beneficial to improve the accuracy of determining the touch state, thus further improving the accuracy of gesture recognition.

The steps set in the above-described methods only aim to make the description clearer. In implementation, the steps may be combined into one or one step may be divided into multiple steps, which all fall into the protection scope of the present disclosure as long as the same logical relationship is included. Such a trivial amendment or design added to an algorithm or procedure as not changing the algorithm or a central design of the procedure falls into the protection scope of the disclosure.

Figure 11:
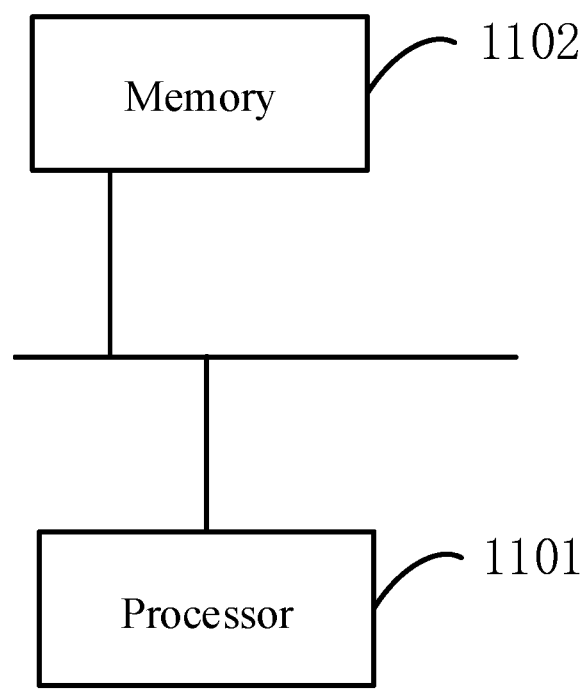
FIG. 11 is a schematic structural diagram of a chip according to a third embodiment of the present disclosure.

A third embodiment of the present disclosure relates to a chip, as shown in FIG. 11, which includes at least one processor 1101; and a memory 1102 communicatively connected to the at least one processor 1101; where the memory 1102 stores an instruction executable by the at least one processor 1101, and the instruction is executed by the at least one processor 1101, so that the at least one processor 1101 may execute the gesture recognition method of the capacitive touch device in the first or second embodiment.

Herein, the memory 1102 and the processor 1101 are connected by bus. The bus may include any number of interconnected buses and bridges, and the bus connects one or more processors 1101 and various circuits of the memory 1102 together. The bus may also connect various other circuits such as a peripheral device, a voltage regulator, a power management circuit and the like, which is common knowledge in the art, and therefore, will not be further described herein. A bus interface provides an interface between the bus and a transceiver. The transceiver may be one element or multiple elements, such as multiple receivers and transmitters, providing a unit for communicating with various other devices on a transmission medium. Data processed by the processor 1101 is transmitted on a wireless medium through an antenna. Further, the antenna also receives the data and transmits the data to the processor 1101.

The processor 1101 is responsible for bus management and general processing, and may further provide various functions, including a timing, a peripheral interface, a voltage regulation, a power management and other control functions, while the memory 1102 may be used to store data used by the processor 1101 when performing operations.

A fourth embodiment of the present disclosure relates to a capacitive touch device, which includes the chip in the third embodiment.

A fifth embodiment of the present disclosure relates to a computer-readable storage medium storing a computer program. The above-described method embodiments are implemented when the computer program is executed by the processor.

That is, those skilled in the art may understand that all or some steps that realize the above-described embodiments may be performed by instructing related hardware through a program which may be stored in a computer-readable storage medium and which includes several instructions to enable a device (which may be a single-chip microcomputer, a chip, or the like) or a processor to perform all or part of the steps of the method described in each embodiment of the present disclosure. The aforementioned storage media include: a U disk, a mobile hard disk, a read-only memory (ROM), a random access memory (RAM), a magnetic disk or an optical disk and other medium that may store program codes.

Those skilled in the art should appreciate that the aforementioned embodiments are specific embodiments for implementing the present disclosure. In practice, however, various changes may be made in the forms and details of the specific embodiments without departing from the spirit and scope of the present disclosure.

What is claimed is:
1. A gesture recognition method of a capacitive touch device, comprising:

sampling a capacitance of a capacitive sensor in the capacitive touch device to acquire a capacitance sampling value corresponding to a current sampling frame of the capacitive sensor;

determining a first capacitance value of an interference capacitance caused by a liquid on the capacitive sensor according to the capacitance sampling value and reference information corresponding to the current sampling frame; wherein the reference information is initialization information when the current sampling frame is a first sampling frame, and the reference information is characteristic information of a previous sampling frame of the current sampling frame when the current sampling frame is not the first sampling frame;

determining a touch state of the capacitive sensor represented by the current sampling frame according to the capacitance sampling value corresponding to the current sampling frame and the first capacitance value of the interference capacitance; and recognizing a gesture of a user on the capacitive touch device according to the touch state of the capacitive sensor represented by the current sampling frame and timing information of a historical touch state of the capacitive sensor.

2. The gesture recognition method of the capacitive touch device according to claim 1, wherein the reference information comprises a referenced touch state and a referenced first capacitance value;

when the current sampling frame is the first sampling frame, the initialization information comprises an initialized touch state and an initialized first capacitance value; wherein the referenced touch state is the initialized touch state, and the referenced first capacitance value is the initialized first capacitance value; and when the current sampling frame is not the first sampling frame, the characteristic information of the previous sampling frame of the current sampling frame comprises a touch state of the capacitive sensor represented by the previous sampling frame of the current sampling frame and the first capacitance value of the interference capacitance caused by the liquid on the capacitive sensor in the previous sampling frame of the current sampling frame; wherein the referenced touch state is the touch state of the capacitive sensor represented by the previous sampling frame, and the referenced first capacitance value is the first capacitance value of the interference capacitance caused by the liquid on the capacitive sensor in the previous sampling frame.

3. The gesture recognition method of the capacitive touch device according to claim 2, wherein determining the first capacitance value of the interference capacitance caused by the liquid on the capacitive sensor according to the capacitance sampling value and the reference information corresponding to the current sampling frame comprises:

when the referenced touch state is a touch state, determining a second capacitance value of the interference capacitance caused by the liquid on the capacitive sensor according to the capacitance sampling value corresponding to the current sampling frame; and determining the first capacitance value of the interference capacitance caused by the liquid on the capacitive sensor according to the second capacitance value and the referenced first capacitance value.

4. The gesture recognition method of the capacitive touch device according to claim 3, wherein determining the second capacitance value of the interference capacitance caused by the liquid on the capacitive sensor according to the capacitance sampling value corresponding to the current sampling frame comprises:

taking a difference between the capacitance sampling value corresponding to the current sampling frame and a base capacitance value of the capacitive sensor as a capacitance detection value; wherein the base capacitance value represents a capacitance value of the capacitive sensor acquired by sampling under the condition of no user touch and no liquid contact;

judging whether the capacitance detection value is greater than a preset capacitance threshold; wherein the preset capacitance threshold is greater than a touch threshold of the capacitive sensor; the touch threshold is a threshold of a capacitance value configured to indicate that the touch state of the capacitive sensor is a touch state when there is no liquid on the capacitive sensor;

taking a difference between the capacitance detection value and the preset capacitance threshold as the second capacitance value of the interference capacitance caused by the liquid on the capacitive sensor when it is determined that the capacitance detection value is greater than the preset capacitance threshold; and taking an initialized second capacitance value as the second capacitance value of the interference capacitance caused by the liquid on the capacitive sensor when it is determined that the capacitance detection value is less than or equal to the preset capacitance threshold.

5. The gesture recognition method of the capacitive touch device according to claim 3, wherein determining the first capacitance value of the interference capacitance caused by the liquid on the capacitive sensor according to the second capacitance value and the referenced first capacitance value comprises:

judging whether the second capacitance value is greater than the referenced first capacitance value;

taking the second capacitance value as the first capacitance value of the interference capacitance caused by the liquid on the capacitive sensor when it is determined that the second capacitance value is greater than the referenced first capacitance value; and attenuating the referenced first capacitance value and taking the referenced first capacitance value after attenuating as the first capacitance value of the interference capacitance caused by the liquid on the capacitive sensor when it is determined that the second capacitance value is less than or equal to the referenced first capacitance value.

6. The gesture recognition method of the capacitive touch device according to claim 3, wherein determining the touch state of the capacitive sensor represented by the current sampling frame according to the capacitance sampling value and the first capacitance value of the interference capacitance corresponding to the current sampling frame comprises:

taking a difference between the capacitance sampling value corresponding to the current sampling frame and the base capacitance value of the capacitive sensor as the capacitance detection value; wherein the base capacitance value represents the capacitance value of the capacitive sensor acquired by sampling under the condition of no hand touch and no liquid contact;

judging whether the capacitance detection value is greater than a sum of the first capacitance value of the interference capacitance and a hand-raising threshold of the capacitive sensor; wherein, the hand-raising threshold is a threshold of a capacitance value configured to indicate that the touch state of the capacitive sensor is a no touch state when there is no liquid on the capacitive sensor;

determining that the touch state of the capacitive sensor represented by the current sampling frame is the touch state when it is determined that the capacitance detection value is greater than the sum of the first capacitance value of the interference capacitance and the hand-raising threshold of the capacitive sensor; and determining that the touch state of the capacitive sensor represented by the current sampling frame is the no touch state when it is determined that the capacitance detection value is less than or equal to the sum of the first capacitance value of the interference capacitance and the hand-raising threshold of the capacitive sensor.

7. The gesture recognition method of the capacitive touch device according to claim 2, wherein determining the first capacitance value of the interference capacitance caused by the liquid on the capacitive sensor according to the capacitance sampling value and the reference information corresponding to the current sampling frame comprises:

determining the first capacitance value of the interference capacitance caused by the liquid on the capacitive sensor according to the capacitance sampling value and the referenced first capacitance value corresponding to the current sampling frame, when the referenced touch state is a no touch state.

8. The gesture recognition method of the capacitive touch device according to claim 7, wherein determining the first capacitance value of the interference capacitance caused by the liquid on the capacitive sensor according to the capacitance sampling value and the referenced first capacitance value corresponding to the current sampling frame comprises:

taking a difference between the capacitance sampling value corresponding to the current sampling frame and the base capacitance value of the capacitive sensor as the capacitance detection value; wherein the base capacitance value represents the capacitance value of the capacitive sensor acquired by sampling under the condition of no hand touch and no liquid contact;

judging whether the capacitance detection value is greater than the referenced first capacitance value;

taking the referenced first capacitance value as the first capacitance value of the interference capacitance caused by the liquid on the capacitive sensor when it is determined that the capacitance detection value is greater than the referenced first capacitance value; and taking the capacitance detection value as the first capacitance value of the interference capacitance caused by the liquid on the capacitive sensor when it is determined that the capacitance detection value is less than or equal to the referenced first capacitance value.

9. The gesture recognition method of the capacitive touch device according to claim 8, wherein determining the touch state of the capacitive sensor represented by the current sampling frame according to the capacitance sampling value and the first capacitance value of the interference capacitance corresponding to the current sampling frame comprises:

judging whether the capacitance detection value is greater than a sum of the first capacitance value of the interference capacitance and a touch threshold of the capacitive sensor; wherein, the touch threshold is a threshold of a capacitance value configured to indicate that the touch state of the capacitive sensor is a touch state when there is no liquid on the capacitive sensor;

determining that the touch state of the capacitive sensor represented by the current sampling frame is a touch state when it is determined that the capacitance detection value is greater than the sum of the first capacitance value of the interference capacitance and the touch threshold of the capacitive sensor; and determining that the touch state of the capacitive sensor represented by the current sampling frame is a no touch state when it is determined that the capacitance detection value is less than or equal to the sum of the first capacitance value of the interference capacitance and the touch threshold of the capacitive sensor.

10. The gesture recognition method of the capacitive touch device according to claim 1, wherein determining the touch state of the capacitive sensor represented by the current sampling frame according to the capacitance sampling value and the first capacitance value of the interference capacitance corresponding to the current sampling frame comprises:

taking a difference between the capacitance sampling value corresponding to the current sampling frame and a base capacitance value of the capacitive sensor as a capacitance detection value; wherein the base capacitance value represents a capacitance value of the capacitive sensor acquired by sampling under the condition of no hand touch and no liquid contact;

determining a hand capacitance value according to a difference between the capacitance detection value and the first capacitance value of the interference capacitance; wherein the hand capacitance value is configured to represent a capacitance change value caused by a hand on the capacitive sensor; and determining the touch state of the capacitive sensor represented by the current sampling frame according to the hand capacitance value.

11. A non-transitory computer-readable storage medium storing a computer program, wherein the computer program, when executed by a processor, implements the gesture recognition method of the capacitive touch device according to claim 1.

12. A chip, comprising:

at least one processor; and a memory communicatively connected to the at least one processor; wherein, the memory is configured to store an instruction executable by the at least one processor, and the instruction is executed by the at least one processor, so that the at least one processor executes a gesture recognition method, wherein the gesture recognition method comprises:

sampling a capacitance of a capacitive sensor in the capacitive touch device to acquire a capacitance sampling value corresponding to a current sampling frame of the capacitive sensor;

determining a first capacitance value of an interference capacitance caused by a liquid on the capacitive sensor according to the capacitance sampling value and reference information corresponding to the current sampling frame; wherein the reference information is initialization information when the current sampling frame is a first sampling frame, and the reference information is characteristic information of a previous sampling frame of the current sampling frame when the current sampling frame is not the first sampling frame;

determining a touch state of the capacitive sensor represented by the current sampling frame according to the capacitance sampling value corresponding to the current sampling frame and the first capacitance value of the interference capacitance; and recognizing a gesture of a user on the capacitive touch device according to the touch state of the capacitive sensor represented by the current sampling frame and timing information of a historical touch state of the capacitive sensor.

13. The chip according to claim 12, wherein the reference information comprises a referenced touch state and a referenced first capacitance value;

when the current sampling frame is the first sampling frame, the initialization information comprises an initialized touch state and an initialized first capacitance value; wherein the referenced touch state is the initialized touch state, and the referenced first capacitance value is the initialized first capacitance value; and when the current sampling frame is not the first sampling frame, the characteristic information of the previous sampling frame of the current sampling frame comprises a touch state of the capacitive sensor represented by the previous sampling frame of the current sampling frame and the first capacitance value of the interference capacitance caused by the liquid on the capacitive sensor in the previous sampling frame of the current sampling frame; wherein the referenced touch state is the touch state of the capacitive sensor represented by the previous sampling frame, and the referenced first capacitance value is the first capacitance value of the interference capacitance caused by the liquid on the capacitive sensor in the previous sampling frame.

14. The chip according to claim 13, wherein determining the first capacitance value of the interference capacitance caused by the liquid on the capacitive sensor according to the capacitance sampling value and the reference information corresponding to the current sampling frame comprises:

when the referenced touch state is a touch state, determining a second capacitance value of the interference capacitance caused by the liquid on the capacitive sensor according to the capacitance sampling value corresponding to the current sampling frame; and determining the first capacitance value of the interference capacitance caused by the liquid on the capacitive sensor according to the second capacitance value and the referenced first capacitance value.

15. The chip according to claim 14, wherein determining the second capacitance value of the interference capacitance caused by the liquid on the capacitive sensor according to the capacitance sampling value corresponding to the current sampling frame comprises:

taking a difference between the capacitance sampling value corresponding to the current sampling frame and a base capacitance value of the capacitive sensor as a capacitance detection value; wherein the base capacitance value represents a capacitance value of the capacitive sensor acquired by sampling under the condition of no user touch and no liquid contact;

judging whether the capacitance detection value is greater than a preset capacitance threshold; wherein the preset capacitance threshold is greater than a touch threshold of the capacitive sensor; the touch threshold is a threshold of a capacitance value configured to indicate that the touch state of the capacitive sensor is a touch state when there is no liquid on the capacitive sensor;

taking a difference between the capacitance detection value and the preset capacitance threshold as the second capacitance value of the interference capacitance caused by the liquid on the capacitive sensor when it is determined that the capacitance detection value is greater than the preset capacitance threshold; and taking an initialized second capacitance value as the second capacitance value of the interference capacitance caused by the liquid on the capacitive sensor when it is determined that the capacitance detection value is less than or equal to the preset capacitance threshold.

16. The chip according to claim 14, wherein determining the first capacitance value of the interference capacitance caused by the liquid on the capacitive sensor according to the second capacitance value and the referenced first capacitance value comprises:

judging whether the second capacitance value is greater than the referenced first capacitance value;

taking the second capacitance value as the first capacitance value of the interference capacitance caused by the liquid on the capacitive sensor when it is determined that the second capacitance value is greater than the referenced first capacitance value; and attenuating the referenced first capacitance value and taking the referenced first capacitance value after attenuating as the first capacitance value of the interference capacitance caused by the liquid on the capacitive sensor when it is determined that the second capacitance value is less than or equal to the referenced first capacitance value.

17. The chip according to claim 14, wherein determining the touch state of the capacitive sensor represented by the current sampling frame according to the capacitance sampling value and the first capacitance value of the interference capacitance corresponding to the current sampling frame comprises:

taking a difference between the capacitance sampling value corresponding to the current sampling frame and the base capacitance value of the capacitive sensor as the capacitance detection value; wherein the base capacitance value represents the capacitance value of the capacitive sensor acquired by sampling under the condition of no hand touch and no liquid contact;

judging whether the capacitance detection value is greater than a sum of the first capacitance value of the interference capacitance and a hand-raising threshold of the capacitive sensor; wherein, the hand-raising threshold is a threshold of a capacitance value configured to indicate that the touch state of the capacitive sensor is a no touch state when there is no liquid on the capacitive sensor;

determining that the touch state of the capacitive sensor represented by the current sampling frame is the touch state when it is determined that the capacitance detection value is greater than the sum of the first capacitance value of the interference capacitance and the hand-raising threshold of the capacitive sensor; and determining that the touch state of the capacitive sensor represented by the current sampling frame is the no touch state when it is determined that the capacitance detection value is less than or equal to the sum of the first capacitance value of the interference capacitance and the hand-raising threshold of the capacitive sensor.

18. The chip according to claim 13, wherein determining the first capacitance value of the interference capacitance caused by the liquid on the capacitive sensor according to the capacitance sampling value and the reference information corresponding to the current sampling frame comprises:
  determining the first capacitance value of the interference capacitance caused by the liquid on the capacitive sensor according to the capacitance sampling value and the referenced first capacitance value corresponding to the current sampling frame, when the referenced touch state is a no touch state.

19. The chip according to claim 18, wherein determining the first capacitance value of the interference capacitance caused by the liquid on the capacitive sensor according to the capacitance sampling value and the referenced first capacitance value corresponding to the current sampling frame comprises:
  taking a difference between the capacitance sampling value corresponding to the current sampling frame and the base capacitance value of the capacitive sensor as the capacitance detection value; wherein the base capacitance value represents the capacitance value of the capacitive sensor acquired by sampling under the condition of no hand touch and no liquid contact;
  judging whether the capacitance detection value is greater than the referenced first capacitance value;
  taking the referenced first capacitance value as the first capacitance value of the interference capacitance caused by the liquid on the capacitive sensor when it is determined that the capacitance detection value is greater than the referenced first capacitance value; and
  taking the capacitance detection value as the first capacitance value of the interference capacitance caused by the liquid on the capacitive sensor when it is determined that the capacitance detection value is less than or equal to the referenced first capacitance value.

20. A capacitive touch device, comprising a chip, wherein the chip, comprising:
  at least one processor; and
  a memory communicatively connected to the at least one processor; wherein,
  the memory is configured to store an instruction executable by the at least one processor, and the instruction is executed by the at least one processor, so that the at least one processor executes a gesture recognition method, wherein the gesture recognition method comprises:
  sampling a capacitance of a capacitive sensor in the capacitive touch device to acquire a capacitance sampling value corresponding to a current sampling frame of the capacitive sensor;
  determining a first capacitance value of an interference capacitance caused by a liquid on the capacitive sensor according to the capacitance sampling value and reference information corresponding to the current sampling frame; wherein the reference information is initialization information when the current sampling frame is a first sampling frame, and the reference information is characteristic information of a previous sampling frame of the current sampling frame when the current sampling frame is not the first sampling frame;
  determining a touch state of the capacitive sensor represented by the current sampling frame according to the capacitance sampling value corresponding to the current sampling frame and the first capacitance value of the interference capacitance; and
  recognizing a gesture of a user on the capacitive touch device according to the touch state of the capacitive sensor represented by the current sampling frame and timing information of a historical touch state of the capacitive sensor.

* * * * *